United States Patent
Snellman et al.

(10) Patent No.: US 10,063,489 B2
(45) Date of Patent: Aug. 28, 2018

(54) BUFFER BLOAT CONTROL

(71) Applicant: TECLO NETWORKS AG, Zürich (CH)

(72) Inventors: Juho Snellman, Zürich (CH); Luke Gorrie, Burglaeunen (CH)

(73) Assignee: SANDVINE TECHNOLOGIES (CANADA) INC., Waterloo (CA)

( * ) Notice: Subject to any disclaimer, the term of this patent is extended or adjusted under 35 U.S.C. 154(b) by 0 days.

(21) Appl. No.: 15/120,503

(22) PCT Filed: Feb. 20, 2014

(86) PCT No.: PCT/EP2014/053319
§ 371 (c)(1),
(2) Date: Aug. 19, 2016

(87) PCT Pub. No.: WO2015/124187
PCT Pub. Date: Aug. 27, 2015

(65) Prior Publication Data
US 2017/0070442 A1    Mar. 9, 2017

(51) Int. Cl.
*H04L 12/891* (2013.01)
*H04L 29/06* (2006.01)
*H04L 12/933* (2013.01)

(52) U.S. Cl.
CPC ............ *H04L 47/41* (2013.01); *H04L 49/103* (2013.01); *H04L 69/16* (2013.01)

(58) Field of Classification Search
CPC ...................................................... H04L 47/41
See application file for complete search history.

(56) References Cited

U.S. PATENT DOCUMENTS

| | | | |
|---|---|---|---|
| 7,161,947 B1 * | 1/2007 | Desai | ............... H04L 67/06 370/389 |
| 7,418,494 B2 | 8/2008 | Dahlin et al. | |
| 7,627,659 B2 * | 12/2009 | Ludwig | ............... H04L 47/10 709/223 |
| 7,706,266 B2 | 4/2010 | Plamondon | |

(Continued)

FOREIGN PATENT DOCUMENTS

WO    2011/079381 A1    7/2011

OTHER PUBLICATIONS

Nichols, K., and V. Jacobson, "Controlled Delay Active Queue Management," draft-nichols-tsvwg-aqm-codel-02, Work in Progress, Mar. 10, 2014, 18 pages.

(Continued)

*Primary Examiner* — John Blanton
(74) *Attorney, Agent, or Firm* — Davis Wright Tremaine LLP

(57) ABSTRACT

TCP data packets are transferred from a plurality of server nodes to a client node, wherein the proxy node captures all packets of the TCP flows, buffers the captured packets in a TCP stack and updates an active TCP flow list in a subscriber record representing the client node. A current proxy scheduling capacity from a current maximum amount of data allowed concurrently in transmission in one more TCP flows to the client node is estimated. When a triggering event is received, a packet retrieved from the TCP stack is scheduled in accordance with the estimated current proxy scheduling capacity and order given by the active flow list. The scheduled packet is transmitted and the active flow list is updated, whereupon scheduling a TCP flow for transmission is repeated until the current proxy scheduling capacity has been reached or there are no TCP flows in the active flow list.

19 Claims, 2 Drawing Sheets

(56) References Cited

U.S. PATENT DOCUMENTS

| | | | |
|---|---|---|---|
| 2003/0212739 A1* | 11/2003 | Boucher | H04L 29/06 709/203 |
| 2007/0008884 A1* | 1/2007 | Tang | H04L 29/06 370/230 |
| 2007/0206497 A1 | 9/2007 | Plamondon et al. | |
| 2007/0206621 A1 | 9/2007 | Plamondon et al. | |
| 2008/0225721 A1 | 9/2008 | Plamondon | |
| 2010/0121972 A1 | 5/2010 | Samuels et al. | |
| 2011/0276699 A1 | 11/2011 | Pedersen | |
| 2012/0078994 A1 | 3/2012 | Jackowski et al. | |
| 2012/0327779 A1 | 12/2012 | Gell et al. | |

OTHER PUBLICATIONS

Pan R., et al., "PIE: A Lightweight Control Scheme to Address the Bufferbloat Problem," 2013 IEEE 14th International Conference on High Performance Switching and Routing (HPSR), Jul. 8-11, 2013, pp. 148-155.

International Preliminary Report on Patentability dated Feb. 3, 2016, in International Patent Application No. PCT/EP2014/053319, filed Feb. 20, 2014, 15 pages.

International Search Report dated Oct. 21, 2014, in International Patent Application No. PCT/EP2014/053319, filed Feb. 20, 2014, 4 pages.

Chebrolu et al., "A Network Layer Approach to Enable TCP over Multiple Interfaces," Wireless Networks 11 (5):637-650, Sep. 1, 2005.

Written Opinion of the International Searching Authority dated Aug. 20, 2016, International Patent Application No. PCT/EP2014/053319, filed Feb. 20, 2014, seven pages.

* cited by examiner

BUFFER BLOAT CONTROL

TECHNICAL FIELD

The present disclosure relates to a method and device for transferring TCP data packets from a plurality of server nodes to a client node. In particular, the disclosure relates to a method and a device for reducing latency of TCP data packet transmission in a wireless network environment.

BACKGROUND ART

TCP short for Transmission Control Protocol is the most dominant protocol used in computer networking and on the Internet. In TCP network congestion is generally indicated by packet loss—overloaded network nodes will drop packets, which will signal the TCP sender to slow down the connection.

In modern cellular networks the final cellular link uses aggressive error correction and retransmission to hide any radio problems from the TCP layer. The TCP congestion avoidance algorithm relies on packet drops to determine the bandwidth available. It speeds up the data transfer until packets start to drop, then slows down the connection. Ideally it speeds up and slows down until it finds equilibrium equal to the speed of the link. However, for this to work the packet drops must occur in a timely manner, so that the algorithm can select a suitable transfer speed.

For TCP connections with a large congestion window, this also implies buffering relatively large amounts of data for a connection in the nodeB; buffering up to 30 s of data has been observed. With a large buffer that has been filled, the packets will arrive at their destination, but with a higher latency. This buffering directly causes long round trip times, in an effect known as buffer bloat. Since there is no packet loss on the link, just delays, standard TCP algorithms will never slow down the connection and the buffers just keep on growing. Newly arriving packets are dropped only when the buffer is fully saturated. This effect is particularly problematic for an internet connection being shared by multiple users, e.g. where one or more users are doing a large batch transfers while others are trying to use the connection interactively. In a first-in first-out queuing system, larger buffers result in longer queues and higher latency, but do not improve network throughput and may reduce throughput to zero.

Thus, it is a problem with prior art solutions that the TCP/IP protocol continues to send more and more data without waiting for any of that data to be acknowledged until either the TCP receiver's buffer is full, or some packets are dropped by the network. As a result it is common for large numbers of packets to be queued up in the network towards a TCP end point. This queue then causes problems for interactive TCP/IP traffic running towards the same host. Interactive service packets are queued for sometimes many seconds.

SUMMARY OF THE INVENTION

The described invention solves the buffer bloat problem by inserting a transparent TCP proxy between the client node and the server nodes, and by actively managing the volume of outstanding data for each flow going to the client node TCP flows going to a client node to ensure that no single TCP flow.

This is achieved by the disclosed method in a proxy node for transferring transmission control protocol, TCP, data packets in TCP flows from a plurality of server nodes to a client node. The proxy node captures all TCP data packets of the TCP flows, buffers the captured TCP data packets and updates an active TCP flow list in a subscriber record representing the client node. The method for transferring the TCP data packets comprises estimating a current proxy scheduling capacity from a current maximum amount of data allowed concurrently in transmission in one or more TCP flows to the client node. When a TCP data packet transmission triggering event is received, a TCP data packet data packet retrieved from the TCP stack is scheduled in accordance with the estimated current proxy scheduling capacity and order given by the TCP active flow list for the subscriber. One or more TCO data packets from the scheduled flow is transmitted to the client node. Following transmission, the active flow list is updated. Scheduling a TCP flow for transmission is then repeated until the current proxy scheduling capacity has been reached or there are no TCP flows in the active flow list.

The disclosed method provides an advantageous solution for reducing latency of TCP/IP data transmission and alleviates the buffer bloat problem. It is an advantage of the disclosed method that it is performed in an intermediary proxy node that decouples the connection from the plurality of server nodes to the client node. Furthermore, performing the method in a central location requires no update in the transmitting server nodes nor in the receiving client node. Estimating the capacity by means of a current maximum amount of data allowed concurrently in transmission for active flows, is particularly advantageous for a client node that switches from slower transmission technology to a fast transmission technology, for example from HSPA+ to UMTS.

In accordance with an aspect of the disclosure, the estimating of a current proxy scheduling capacity further includes determining a roundtrip time for one or more transmitted TCP data packets; and adjusting the estimated current proxy scheduling capacity based on the roundtrip time, the amount of data in transmission at the time of transmission of the one or more TCP data packets, and/or one or more predetermined adjustment factors.

In accordance with a further aspect of the disclosure, the step of adjusting the estimated current proxy scheduling capacity comprises applying a speed-up or slow-down factor. The use of predetermined speed-up or slow-down factors provides an enhanced configurability of latency reducing solution.

In accordance with a further aspect of the disclosure, the method further comprises storing the determined roundtrip time as a previous roundtrip time when exceeding a predetermined roundtrip time threshold. The current roundtrip time is compared to the previous roundtrip time. When the previous roundtrip time is greater than the current round-trip time and current roundtrip time exceeds the predetermined roundtrip time threshold, the proxy scheduling capacity is maintained.

The step of storing a previous roundtrip time and comparing the current roundtrip time to the previous during estimation of proxy scheduling capacity, provides the advantage of compensating for effect of network freezes, e.g. cellular network freezes.

In accordance with yet an aspect of the disclosure, the proxy node is configured to capture user datagram protocol, UDP, data packets and forward the captured UDP data packets. When the proxy node handles UDP data packets, the method further comprising interleaving the UDP data packets with the TCP data packets during the step of scheduling. A data stream comprising the interleaved TCP and UDP packets is inspected and an amount of remaining UDP data packets is determined from the delivery information. The determined amount is used to improve the scheduling.

The interleaved handling of TCP and UDP data packets enables an improved handling of latency sensitive applications such as games and video-conferencing that often use UDP instead of TCP.

In accordance with a further embodiment, the disclosure relates to a proxy node for transferring transmission control protocol, TCP, data packets in TCP flows from a plurality of server nodes to a client node. The proxy node comprises a receiver configured to receive TCP data packets destined for the client node. A memory of the proxy node is configured to store the received TCP data packets and to update an active TCP flow list in a subscriber record representing the client node. The proxy node also includes a processor configured to schedule a TCP data packet of a TCP flow based on an order given by the TCP active flow list for the subscriber, initiate transmission of one or more TCP data packets from the scheduled flow, update the active flow list and repeat the step of scheduling a TCP flow for transmission until the current proxy scheduling capacity has been reached or there are no TCP flows in the active flow list. The proxy node also comprises a transmitter configured to transmit the TCP data packet.

The proxy node displays advantages corresponding to the advantages already described in relation to the method.

In accordance with a further embodiment, the disclosure also relates to a computer program comprising computer program code which, when executed in a proxy node causes the proxy node to execute the disclosed method.

With the above in mind, the object of the present disclosure is to overcome at least some of the disadvantages of known technology as described above and below.

BRIEF DESCRIPTION OF THE DRAWINGS

The present technique will be more readily understood through the study of the following detailed description of the embodiments/aspects together with the accompanying drawings, of which.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The general idea of the disclosure is to improve the perceived latency of a destination node communicating with multiple source nodes in an IP network, in particular in an IP network where the destination node is a wireless device. Embodiments of the present disclosure relate, in general, to the field of TCP packets. However, it must be understood that the same principles are applicable for other types of packets, e.g encapsulated packets in a radio network.

The technical solution involves a performance enhancing proxy implementing a transparent store-and-forward TCP policy and taking over the end-to-end responsibility for delivery of TCP data packets. The proxy responds directly to TCP data packets by sending a synthesized ACK packet to the sender. It stores the data packet, and eventually forwards it to the recipient. If a TCP retransmission of a data packet is required, it will be done by the proxy.

Figure 1:
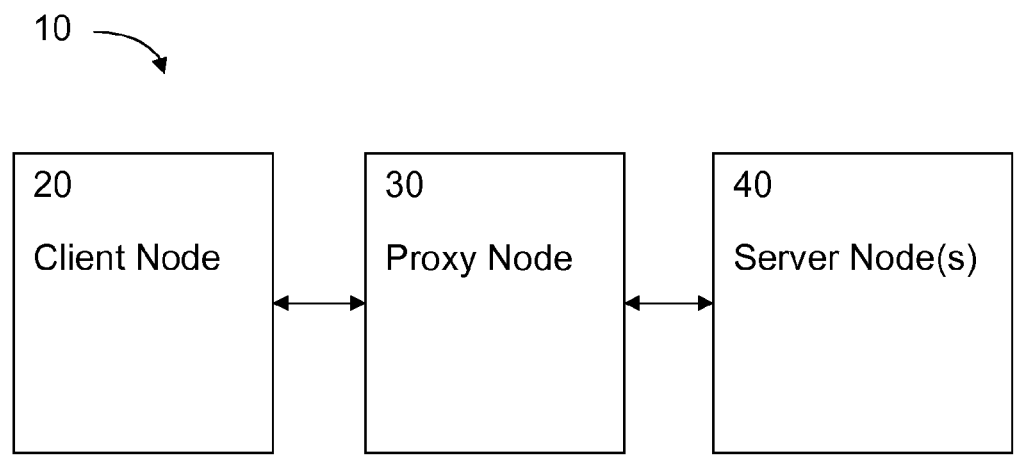
FIG. 1 schematically illustrates a schematic network configuration including the proxy node FIG. 2 schematically illustrates a flow chart of method steps according to embodiments of the disclosure FIG. 3 schematically illustrates a block diagram of a proxy node.

FIG. 1 schematically illustrates an IP network 10. The network 10 comprises server node(s) 40 and a client node 20, e.g. a user equipment in a wireless access network. The network further comprises a proxy node 30 arranged between the server node(s) 40 and the client node 20 in the network 10.

Figure 2:
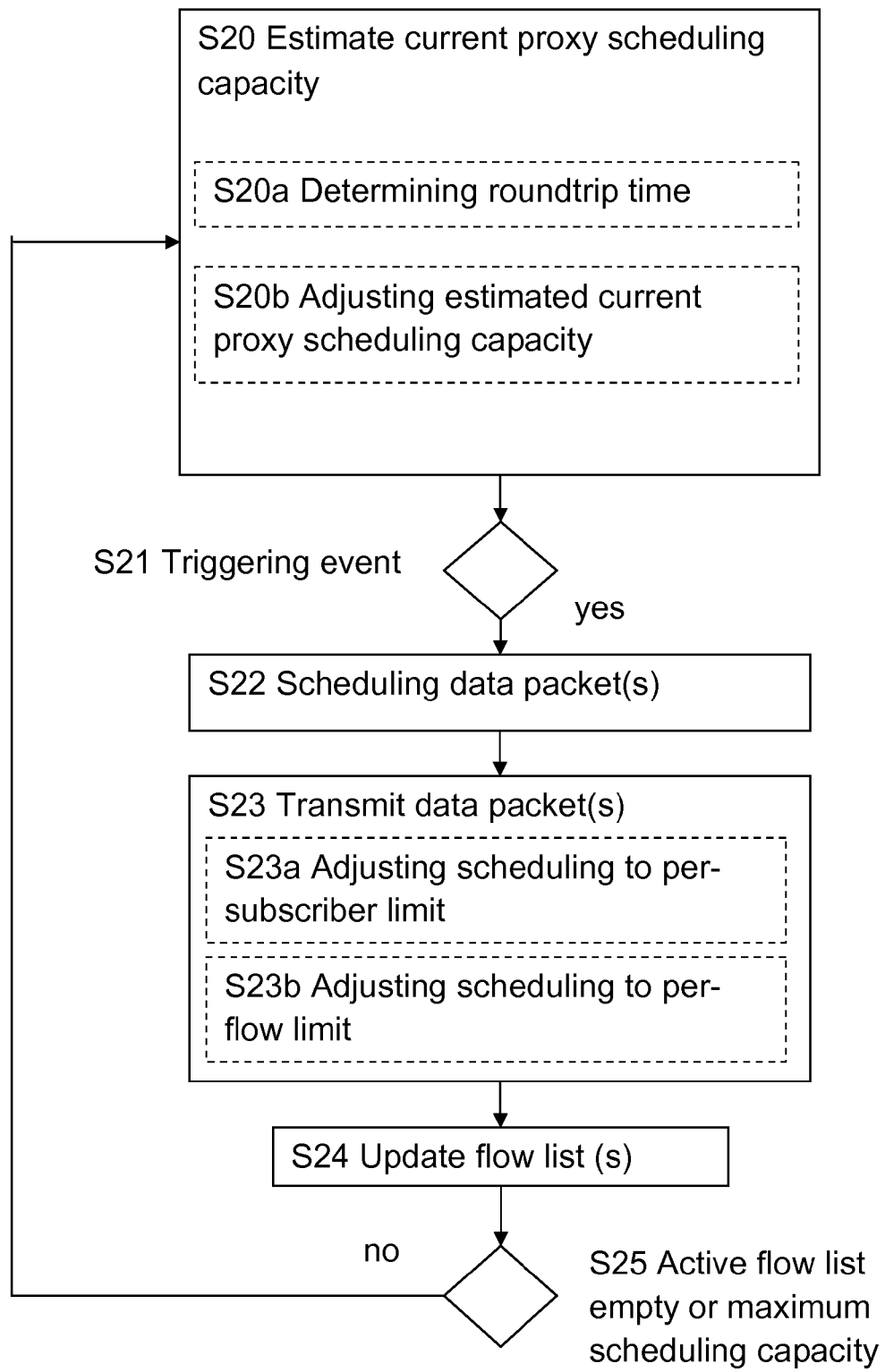

FIG. 2 illustrates a method performed in a proxy node 30 for transferring transmission control protocol, TCP, data packets in TCP flows from a plurality of server nodes 40 to a client node 20. The proxy node 30 captures all TCP data packets of the TCP flows, buffers the captured TCP data packets in a TCP stack and updates an active TCP flow list in a subscriber record representing the client node. The disclosed per-client scheduling routine is used whenever TCP data packets would normally be sent for a TCP flow to the receiving client.

In a first step S20 performed in the proxy node 30, a current proxy scheduling capacity is estimated from a current maximum amount of data allowed concurrently in transmission in one or more TCP flows to the client node. The capacity is estimated as bytes in flight toward the client, i.e. the actual amount of bytes and not the rate of sending bytes. The current capacity estimate is stored in the subscriber record, e.g as a field 'max-bytes-in-flight'.

When a TCP data packet transmission triggering event is received S21, scheduling S22 of a TCP data packet retrieved from the TCP stack is performed in accordance with the estimated current proxy scheduling capacity and order given by the active flow list; Triggering events include any known reason to transmit a data packet to the receiving client, e.g receiving an acknowledgement of some data, opening some congestion window or receipt of some data from any of the sending servers. However, transmits caused either due to a retransmit time-out or a TCP fast retransmit do not trigger packet scheduling.

The subscriber record contains a list of active TCP flows. A flow is in the active list if the proxy has currently unsent data buffered for the flow. In accordance with an aspect of the disclosure, the subscriber record also includes a list of passive TCP flows. The passive list represents TCP flows that are not in the active list. When new data is received for a flow on the passive list, it moves to the active list, e.g. to the beginning of the active list. When new data is received for a flow on the active list, it remains in its old position. When all buffered data has been sent from a flow, the flow is moved to the beginning of the passive list. The order of the flows listed in the passive flow basically does not matter, but list may be ordered according to a time of entry on the passive flow list or with any other choice of order.

In addition to the estimated current proxy scheduling capacity, the proxy node may also have configurable limits. A per-subscriber limit determines a minimum amount of bytes allowed in transmission for a specific client, 'min-subscriber-in-flight-bytes'. A per-flow limit determines a minimum amount of bytes allowed in transmission for a specific flow, 'min-flow-in-flight-bytes'.

According to an aspect of the disclosure, a scheduling routine comprises iterating through the active list of flows.

For each flow, transmission of a packet from the flow is enabled when the flow has fewer than a predetermined minimum amount of bytes in transmission 'min-flow-in-flight-bytes'. Furthermore the total amount of bytes in transmission toward the client should be lower than a proxy scheduling capacity, i.e. the current maximum amount of data allowed concurrently in transmission toward the client, e.g. as defined in the field 'max-bytes-in-flight'. Transmission of data is also conditioned by predetermined minimum amount of data per subscriber.

One or more packets are transmitted for a flow if one or more of the following conditions are assessed to be true:
- There are currently fewer than a min-flow-in-flight bytes in flight toward the TCP flow.
- The current total amount of bytes in flight toward the client is lower than the proxy scheduling capacity
- The current total amount of bytes in flight toward the client is lower than a min-subscriber-in-flight bytes.

If no data was transmitted for the flow, the assessment is repeated for the next flow in the active flow list.

Following performance of the scheduling routine for a flow, the scheduled TCP data packet or data packets are transmitted in step S23. The active flow list is subsequently updated in step S24. If TCP data packets were transmitted for a specific flow, the flow is moved to the end of the active flow list and will be handled again at some point during the same single execution of the scheduling routine. According to an aspect of the disclosure, if no un-sent data remains buffered for the specific flow the flow is moved to a passive flow list; thus resulting in an updated passive flow list.

Advantageously, any time a packet is transmitted, the proxy node checks whether there is an odd number of TCP data packets in transmission/flight toward the client node. If so, the proxy node allows transmission of an extra packet to make sure that the client always receives a pair of packets, reducing the impact of the standard TCP delayed acknowledgement mechanism.

Following the update of the active flow list, it is verified in step S25 that there is still unsent data buffered for one or more flows on the active flow list or that the current proxy scheduling capacity has not been reached. The scheduling procedure is then repeated for another flow on the active flow list, starting with the estimating S20 of a current proxy scheduling capacity.

As mentioned above, estimating the current proxy scheduling capacity in step S20 comprises estimating the capacity as bytes in transmission/flight toward the client, preferably as an amount of bytes. In accordance with an aspect of the disclosure, the estimated capacity is stored in the proxy node, preferably in a field 'max-bytes-in-flight' in a subscriber record in the proxy node.

Each TCP data packet has an associated metadata record, which contains a 'transmit-timestamp' field containing the time when the data packets was last transmitted and a 'bytes-in-flight-when-transmitted' field including the amount of bytes towards the client when the TCP data packet was last transmitted. When a TCP data packet is transmitted the field 'tcp-bytes-in-flight' is incremented by the size of the packet. When delivery of the TCP data packet is acknowledged, the field 'tcp bytes in flight' is decreased by the size of the packet. The field 'tcp bytes in flight' is also decremented by the size of the packet, when the TCP data packet is considered lost, e.g. due to a retransmit time-out. Control packets, e.g. TCP acknowledgements, do not affect the capacity estimate.

As further illustrated in FIG. 2, the estimating of a current proxy scheduling capacity also includes determining S20a a roundtrip time for one or more transmitted TCP data packets. The estimated current proxy scheduling capacity is adjusted S20b based on the determined roundtrip and the amount of data in transmission when transmitting the one or more TCP data packets, i.e. bytes in flight toward the client and/or one or more predetermined adjustment factors.

When the roundtrip time is below a minimum threshold for roundtrip times, rtt-min, estimated current proxy scheduling capacity is adjusted based on the 'bytes-in-flight-when-transmitted' field and a speedup factor C1, of e.g 1.2 or any other speedup factor suitable for the purpose of improving latency in TCP data transmission.

If rtt<rtt-min
max-bytes-in-flight=max(max-bytes-in-flight, bytes-in-flight-when-transmitted*C1)
where max-bytes-in-flight is the estimate of a current proxy scheduling capacity, bytes-in-flight-when-transmitted is the amount of bytes in flight toward the client when the delivered packet was originally transmitted and C1 is a speed-up factor.

When the determined roundtrip time is greater than a maximum threshold for roundtrip times, rtt-max, the estimated current proxy scheduling capacity is adjusted based on the 'bytes-in-flight-when-transmitted' field and by a slowdown factor C2, e.g. of 0.9 or any other value suitable for maintaining an acceptable latency during TCP data transmission from the server nodes to the client nodes.

If rtt>rtt-max
max-bytes-in-flight=min(max-bytes-in-flight, bytes-in-flight-when-transmitted*C2)
where max-bytes-in-flight is the estimate of a current proxy scheduling capacity, bytes-in-flight-when-transmitted is the amount of bytes in flight toward the client when the delivered packet was originally transmitted and C2 is a slow-down factor.

A known failure mode of modern cellular connections are intermittent connection freezes, where no data gets delivered for several tenths of a second or even full seconds, after which many packets arrive packed together. These events does not signal latency, but are caused by random radio events. As such, they should be ignored when computing capacity estimates.

In order to filter out such random effects, an aspect of the disclosed method for transferring TCP data packets comprises storing the determined roundtrip time as a previous roundtrip time, previous-rtt. When the previous roundtrip time is greater than the current round-trip time or the previous roundtrip time is lower than a predetermined roundtrip threshold and the current roundtrip time exceeds the predetermined roundtrip time threshold, the proxy scheduling capacity is maintained. Consequently, a long roundtrip time is only taken as evidence of queuing if the previous packet also exceeds the threshold and the previous packet had a lower roundtrip time than the current. Following handling of the packet, the value of previous-rtt is updated to the roundtrip time determined for the handled TCP data packet.

The proxy node is capable of scheduling TCP packet data and lacks awareness of other IP traffic flowing from the one or more server nodes, e.g user datagram protocol, UDP, traffic. However, the proxy node is configured to capture and forward captured UDP data packets as well as TCP packets. Since UDP doesn't have a protocol level acknowledgement system, the proxy node is incapable of determining if the UDP data was actually delivered. When the volume of UDP data is significant and varies over time, latency measurements only relating to TCP data packets may be skewed. This is particularly problematic for latency-sensitive applications such as games and video-conferencing that often use UDP instead of TCP.

According to an aspect of the disclosed method, when the proxy node is configured to capture and forward user datagram protocol, UDP, data packets, the method further comprising interleaving the UDP data packets with the TCP data packets during the step of scheduling S22, transmitting the data packets and estimating current proxy scheduling capacity based on the combination of TCP and UDP data packets.

Assume that the following packets are sent by the proxy toward the client, TCP packet A, interleaved UDP packet B and TCP packet C. Acknowledgement of packet A is taken to contain no information about the status of B. Acknowledgement of TCP packet C is taken to imply delivery of the UDP packet B as well. The presumption is only used for getting a more accurate estimate of the amount of data that is actually in flight, but the presumed delivery of UDP packets is not used as a trigger to adjust the capacity estimate.

One implementation of the UDP-handling solution uses a subscriber record with two 64 bit unsigned integer fields, in the following denominated as 'udp-global-seqnr-sent' and 'udp-global-seqnr-acked'. Each segment record, i.e., metadata associated with the TCP packet, contains the field 'udp-global-seqnr-when-sent. When the proxy node captures a non-TCP packet sent to the client, the content of the field 'udp-global-seqnr-sent' is incremented by the size of the packet. When a TCP data packet is sent to the client, the segment's field 'udp-global-seqnr-when-sent' is set to the value of the subscriber record field 'udp-global-seqnr-sent'. Additionally, when UDP data tracking is enabled, the amount of bytes in transmission will be determined including an assessment of the UDP bytes as well as the TCP bytes in transmission. The value of the field 'tcp-bytes-in-flight-when transmitted' will be set to 'tcp bytes-in-flight'+('udp-global-seqnr-sent'−'udp-global-seqnr-acked'). When a TCP data packets is acknowledged by the client, the 'udp-global-seqnr-acked' is set to max('udp-global-seqnr-sent, udp-global-seqnr-when-sent).

The buffer-bloat compensating proxy node and the disclosed method is beneficial in any type of network environment suffering from latency of TCP/IP data transmission, but particularly so in a wireless network environment. In accordance with an aspect of the disclosure, the client node is a wireless device capable of receiving TCP data packets over a plurality of radio access technologies, e.g. HSPA, UMTS, GPRS or Wi-Fi.

Figure 3:
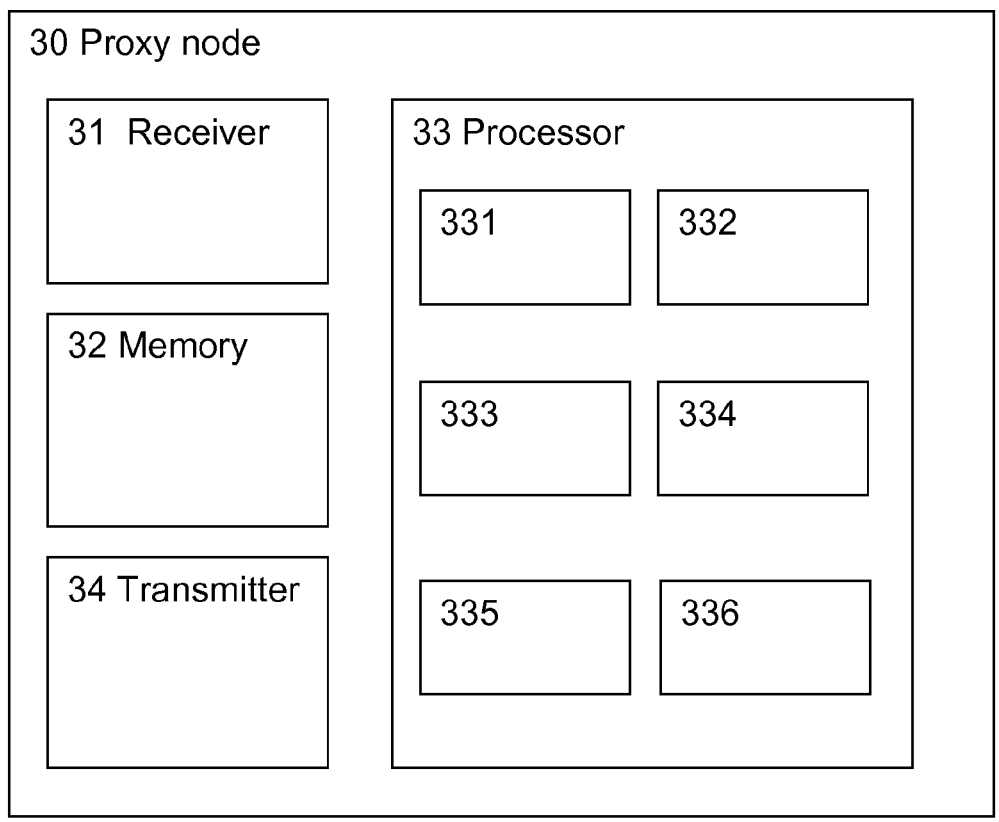

FIG. 3 schematically discloses a proxy node 30 for transferring transmission control protocol, TCP, data packets in TCP flows from a plurality of server nodes (40) to a client node (20). The proxy node comprises a receiver 31 configured to receive TCP data packets destined for the client node. A memory 32 in the proxy node, is configured to store the received TCP data packets and to update an active TCP flow list in a subscriber record representing the client node. The memory may include a buffering TCP stack. The proxy node also includes a processor 33 configured to schedule TCP flow for transmission based on an order given by the TCP active flow list for the subscriber upon receipt of a TCP data packet transmission triggering event. The processor is further configured to initiate transmission of one or more TCP data packets from the scheduled TCP flow. A transmitter 34 is configured to transmit the TCP data packet to a receiving client node. Furthermore, the processor is configured to update the active flow list and to repeat the step of scheduling a TCP flow for transmission until the current proxy scheduling capacity has been reached or there are no TCP flows in the active flow list.

In accordance with an aspect of the disclosure, the processor 33 of the proxy node includes a capacity estimating entity 331 configured to estimate a current proxy scheduling capacity from a current maximum amount of data allowed concurrently in transmission in one or more TCP flows to the client node; and a packet scheduling entity 332 configured to schedule a TCP data packet of a TCP flow according to the estimated current proxy scheduling capacity and an order given by the active flow list.

According to a further aspect of a proxy node, the processor also comprises a packet size determining entity 333 configured to determine a amount data delivered to the client node; and a roundtrip determination entity (334) configured to determine a roundtrip time for one or more transmitted TCP data packets. The roundtrip determination entity 334 may also be configured to configured to compare a roundtrip time to a predetermined roundtrip time threshold, to store the roundtrip time as a previous roundtrip time when exceeding the predetermined roundtrip time threshold, to compare a current roundtrip time to the previous roundtrip time and to instruct the packet scheduling entity to maintain the proxy scheduling capacity when the previous roundtrip time is greater than the current round-trip time and current roundtrip time exceeds the predetermined roundtrip time threshold.

As illustrated in FIG. 3, the processor may also include a per-subscriber limiter 335 configured to adjust the scheduling to a pre-configured per-subscriber limit set for the client node and/or a per-flow limiter 336 configured to adjust the scheduling to a preconfigured per-flow limit.

In an embodiment of the proxy node 30, the receiver (31), is further configured to store receive user datagram protocol, UDP, data packets and the packet scheduling entity 332 of the processor 32 is further configured to schedule UDP packets interleaved with the TCP data packets.

The disclosure also relates to a computer program comprising computer program code which, when executed in a proxy node 30 causes the proxy node 30 to execute the disclosed method.

The disclosed entities 331-336 of the processor are implemented in hardware or in software or in a combination thereof. The entities are according to one aspect implemented as a computer program stored in the memory 32 which run on the processor 33. The proxy node 30 is further configured to implement all the aspects of the disclosure as described in relation to the methods above and it also comprises the corresponding entities.

According to one aspect the disclosure further relates to the above mentioned computer program, comprising computer readable code which, when run on a proxy node causes the proxy node to perform any of the aspects of the method described above.

Although the description above contains many specifics, they should not be construed as limiting but as merely providing illustrations of some presently preferred example embodiments.

The invention claimed is:

1. Method performed in a proxy node for transferring transmission control protocol, TCP, data packets in TCP flows from a plurality of server nodes to a client node, wherein the proxy node captures the TCP data packets of the TCP flows, buffers the captured TCP data packets and updates a TCP active flow list in a subscriber record representing the client node; the method comprising:
  estimating a current proxy scheduling capacity from a current maximum total data amount allowed concurrently in transmission in one or more TCP flows to the client node;
  until the current proxy scheduling capacity has been reached or there are no TCP flows in the TCP active flow list, scheduling a TCP flow for transmission when a TCP data packet transmission triggering event is received, the scheduling based on an order given by the TCP active flow list;
  transmitting one or more TCP data packets from the scheduled TCP flow to the client node;
  updating the TCP active flow list; and
  repeating the step of scheduling a TCP flow for transmission.

2. The method of claim 1, wherein the estimating of a current proxy scheduling capacity further includes:
  determining a roundtrip time for one or more transmitted TCP data packets; and
  adjusting the estimated current proxy scheduling capacity based on the roundtrip time, the data amount in transmission when transmitting the one or more TCP data packets, and/or one or more predetermined adjustment factors.

3. The method of claim 2, wherein the step of adjusting the estimated current proxy scheduling capacity comprises applying a speed-up or slow-down factor.

4. The method of claim 2, wherein the adjusting the estimated current proxy scheduling capacity includes adjusting the current proxy scheduling capacity up or down upon delivery of a TCP packet.

5. The method of claim 1, wherein the client node is a wireless device capable of receiving TCP data packets over a plurality of radio access technologies, e.g. HSPA, UMTS, GPRS, or Wi-Fi.

6. The method of claim 1, wherein the current maximum data amount allowed concurrently in transmission in TCP flows to the client node is an amount of bytes.

7. The method of claim 1, further comprising storing the determined roundtrip time as a previous roundtrip time when exceeding a predetermined roundtrip time threshold, comparing a current roundtrip time to the previous roundtrip time and maintaining a proxy scheduling capacity when the previous roundtrip time is greater than the current round-trip time and current roundtrip time exceeds the predetermined roundtrip time threshold.

8. The method of claim 1, wherein the subscriber record contains a list of active TCP flows and a list of passive TCP flows, wherein a flow is in the list of active TCP flows if there is unsent TCP data packets buffered for the flow and in the passive list if there are no unsent TCP data packets buffered for the flow and wherein a flow is moved from the list of passive TCP flows to the list of active TCP flows when one or more TCP packets are received from the server nodes and when a flow is moved to the list of passive TCP flows when all buffered TCP data packets for a flow has been transmitted to the client node.

9. The method of claim 1, wherein the transmitting TCP data packets further includes allowing transmission of a scheduled TCP flow, when the data amount in transmission is below to a pre-configured per-subscriber limit set for the client node.

10. The method of claim 1, wherein the transmitting TCP data packets further includes allowing transmission of a scheduled TCP flow, when the data amount in transmission is below a pre-configured per-flow limit.

11. The method of claim 1, wherein the proxy node is configured to capture user datagram protocol, UDP, data packets and forward the captured UDP data packets, the method further comprising interleaving the UDP data packets with the TCP data packets during the scheduling, inspecting a data stream comprising the interleaved TCP and UDP data packets, determining an amount of remaining UDP data packets from the delivery information and using the determined amount to improve the scheduling.

12. The method of claim 11, further including presuming acknowledgement of UDP data packets when receiving acknowledgement for a subsequent TCP packet.

13. A proxy node for transferring transmission control protocol, TCP, data packets in TCP flows from a plurality of server nodes to a client node; the proxy node comprising:
  a receiver configured to receive TCP data packets destined for the client node;
  a memory configured to store the received TCP data packets and to update a TCP active flow list in a subscriber record representing the client node;
  a processor configured to:
    estimate a current proxy scheduling capacity from a current maximum total data amount allowed concurrently in transmission in one or more TCP flows to the client node;
    until the current proxy scheduling capacity has been reached or no there are no TCP flows are in the TCP active flow list, schedule a TCP flow for transmission when a TCP data packet transmission triggering event is received, the scheduling based on an order given by the TCP active flow list for the subscriber;
    initiate transmission one or more TCP data packets from the scheduled TCP flow to the client node;
    update the TCP active flow list; and
    repeat the step of scheduling a TCP flow for transmission.

14. The proxy node of claim 13, wherein the processor further is configured to:
  determine a roundtrip time for one or more transmitted TCP data packets; and
  adjust the estimated current proxy scheduling capacity based on the roundtrip time, the data amount in transmission when transmitting the one or more TCP data packets, and/or one or more predetermined adjustment factors.

15. The proxy node of claim 13, wherein the processor is further configured to:
  allow transmission of a scheduled TCP flow, when the data amount in transmission is below to a pre-configured per-subscriber limit set for the client node.

16. The proxy node of claim 13, wherein the processor is further configured to:
  allow transmission of a scheduled TCP flow, when the data amount in transmission is below a pre-configured per-flow limit.

17. The proxy node of claim 13, wherein the processor is further configured to compare a roundtrip time to a predetermined roundtrip time threshold, to store the roundtrip time as a previous roundtrip time when exceeding the predetermined roundtrip time threshold, to compare a current roundtrip time to the previous roundtrip time and to instruct the packet scheduling entity to maintain the proxy scheduling capacity when the previous roundtrip time is greater than the current round-trip time and current roundtrip time exceeds the predetermined roundtrip time threshold.

18. The proxy node of claim 13, wherein the receiver, is further configured to store receive user datagram protocol, UDP, data packets, the memory is further configured to store UDP data packets, and the processor is further configured to interleave the UDP data packets with the TCP data packets during the step of scheduling, inspect a data stream comprising the interleaved TCP and UDP data packets, determine an amount of remaining UDP data packets from the delivery information and use the determined amount to improve the scheduling.

19. A non-transitory computer program comprising computer program code which, when executed in a proxy node causes the proxy node to execute the method claimed claim 1.

\* \* \* \* \*